US011684003B2

(12) United States Patent
Plattner

(10) Patent No.: US 11,684,003 B2
(45) Date of Patent: *Jun. 27, 2023

(54) PLANTER DOWNFORCE CONTROL

(71) Applicant: Precision Planting, LLC, Tremont, IL (US)

(72) Inventor: Chad Plattner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/152,117

(22) Filed: Jan. 19, 2021

(65) Prior Publication Data
US 2021/0136992 A1    May 13, 2021

Related U.S. Application Data

(63) Continuation of application No. 16/632,946, filed as application No. PCT/US2018/040813 on Jul. 3, 2018, now Pat. No. 10,925,203.

(60) Provisional application No. 62/528,297, filed on Jul. 3, 2017.

(51) Int. Cl.
*A01B 63/00* (2006.01)
*A01B 3/24* (2006.01)
*A01B 63/32* (2006.01)
*A01C 5/06* (2006.01)

(52) U.S. Cl.
CPC .............. *A01B 63/008* (2013.01); *A01B 3/24* (2013.01); *A01B 63/32* (2013.01); *A01C 5/062* (2013.01)

(58) Field of Classification Search
CPC ......... A01B 63/008; A01B 3/24; A01B 63/32; A01B 63/002; A01B 63/00; A01B 3/00; A01B 63/24; A01B 63/14; A01C 5/062; A01C 5/06; A01C 5/00
See application file for complete search history.

(56) References Cited

U.S. PATENT DOCUMENTS

| 6,216,616 | B1 * | 4/2001 | Bourgault | ............... A01C 7/06 111/194 |
| 6,460,623 | B1 * | 10/2002 | Knussman | .............. F15B 11/16 111/926 |
| 10,925,203 | B2 * | 2/2021 | Plattner | .................... A01B 3/24 |
| 2005/0045080 | A1 | 3/2005 | Halford et al. | |
| 2006/0081162 | A1 | 4/2006 | Hoehn | |
| 2007/0245938 | A1 | 10/2007 | Bourgault et al. | |
| 2011/0313575 | A1 * | 12/2011 | Kowalchuk | ............ A01C 7/205 111/163 |

OTHER PUBLICATIONS

European Patent Office, Search Report prepared for related European Application No. 18 82 8369, dated Mar. 11, 2021.

* cited by examiner

*Primary Examiner* — Christopher J. Novosad

(57) ABSTRACT

A method of controlling the downpressure on an air seeder that has a plurality of seed assemblies and a plurality of fertilizer assemblies each applying an adjustable downforce, wherein the method includes keeping a total downforce applied by all of the plurality of seed assemblies and all of the plurality of fertilizer assemblies less than a maximum downforce. The method may also include keeping the downforce applied by each of the fertilizer assemblies less than the downforce applied by each of the seed assemblies.

16 Claims, 4 Drawing Sheets

PLANTER DOWNFORCE CONTROL

CROSS-REFERENCE TO RELATED APPLICATION

This application is a continuation of U.S. patent application Ser. No. 16/632,946, "Air Seeder Downforce Control," filed Jan. 22, 2020, which is a national phase entry under 35 U.S.C. § 371 of International Patent Application PCT/US2018/040813, filed Jul. 3, 2018, designating the United States of America and published in English as International Patent Publication WO 2019/010239 A1 on Jan. 10, 2019, which claimed the benefit of the filing date of U. S. Provisional Patent Application 62/528,297, "Air Seeder Downforce Control," filed Jul. 3, 2017, the entire disclosures of each which are incorporated herein by reference.

BACKGROUND

Certain air seeders have seeding tools and fertilizing tools. The seeding tools deposit seeds in the seed furrows opened by the seeding tools and the fertilizing tools may place the fertilizer between the seed rows in addition to or in place of fertilizer placed with the seed. The seeding tools and fertilizer tools can each have variable applied downforce by the action of an actuator, such as a hydraulic cylinder, a pneumatic cylinder, or an electronic actuator. There is a need to manage the total applied downforce in order to maintain an acceptable seed planting depth.

DETAILED DESCRIPTION

Air seeders having variable applied downforce seeding and fertilizing tools are known in the art. One such prior art air seeder having variable applied downforce seeding and fertilizing tools is disclosed in U.S. Patent Publication No. 2007/0245938 ("the '938 Publication"), the disclosure of which is incorporated herein by reference in its entirety. The Mid Row Bander™ from Bourgault Industries, Ltd., is a commercial embodiment of the air seeder disclosed in the '938 Publication. Another example of a prior art air seeder having variable applied downforce seeding and fertilizing tools is disclosed in U.S. Patent Publication No. US2005/0045080 ("the '080 Publication"), the disclosure of which is incorporated herein by reference in its entirety. A commercial embodiment of the air seeder disclosed in the '080 Publication is the Separate Fertilizer Placement Air Drill 1895 from Deere and Company.

Figure 1:
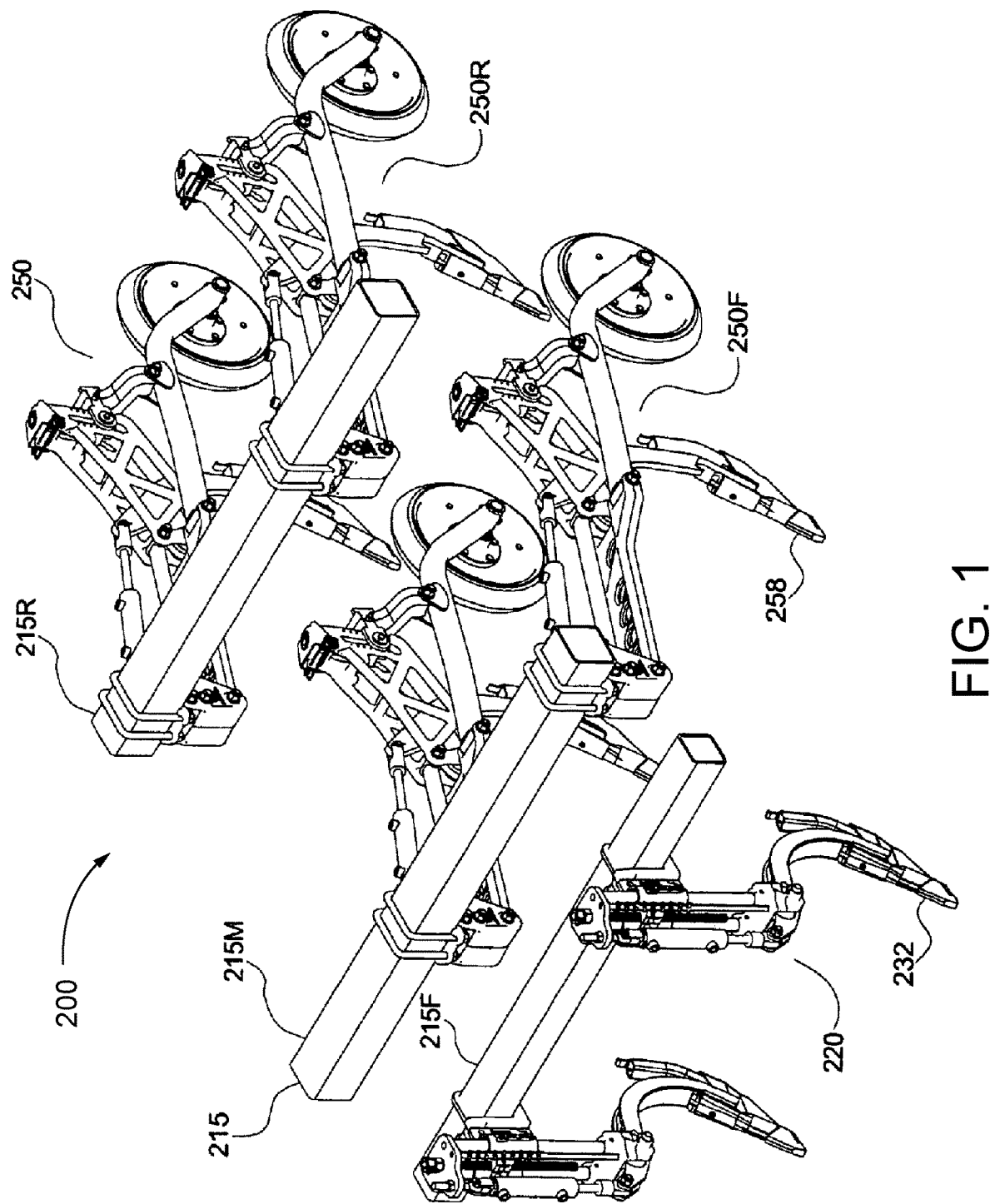
FIG. 1 is a partial perspective view of an embodiment of a prior art air seeder with separate seed tools and fertilizer tools mounted on a frame.

FIG. 1 is a perspective view of a section of an air seeder implement 200. As described in the '938 Publication, the implement 200 includes a frame 215 comprising front, middle, and rear lateral frame members 215F, 215M, and 215R. The frame 215 is mounted on wheels (not shown) for travel over the ground in an operating travel direction P.

Seed assemblies 250 are placed at substantially regular intervals along the middle and rear frame members 215M, 215R so that the seed furrows created are substantially parallel at approximately regular intervals. The fertilizer assemblies 220 are spaced at regular intervals along the front frame member 215F so that the fertilizer furrows opened by the knives 232 of the fertilizer assemblies 220 are positioned substantially mid-way between adjacent pairs of seed furrows created by the seed assemblies 250 as best shown in the front elevation view of FIG. 2.

The knives 232 of the fertilizer assemblies 220 engage the ground along a front line substantially perpendicular to the operating travel direction and about directly under the front frame member 215F, while the first set of seed assemblies 250F are mounted on the middle frame member 215M and engage the ground along a middle line rearward of the front frame member 215F and the knives 232, generally under the rear frame member 215R. The seed assemblies 250R mounted on the rear frame member 215R engage the ground along a rear line rearward of the rear frame member 215R. Ample spacing is thus provided for each ground engaging element, fertilizer knives 232 and seed knives 258.

The seed assemblies 250 comprise a trailing arm 254 pivotally connected at a front end thereof to the frame 215 about substantially horizontal and parallel front arm axes AA and AA' oriented substantially perpendicular to the operating travel direction P. A seed furrow opener, illustrated as a seed knife 258, is attached to the trailing arm 254 and is operative to create a seed furrow when a bottom end thereof is engaged in the ground. A seed feed 260 is mounted to the rearward side of the seed knife 258. A packer wheel 272 is rotatably attached rearward of the seed knife 258 and is oriented to roll substantially along the seed furrow.

A parallel linkage 202 comprises upper and lower links 203, 204, each pivotally attached at forward ends thereof about axes AA and AA' respectively. Rear ends of the links 203, 204 are pivotally attached to the forward ends of a packer bracket 266 about axes BB and BB' respectively. The axes AA, AA', BB, and BB' are oriented such that the upper and lower links 203, 204 are parallel as they move up and down.

Packer wheel arm 268 is pivotally attached at a front end thereof to the packer bracket 266 about axis BB', and packer wheel 272 is rotatably attached to the rear end of the packer wheel arm 268. Seed shank 256 is pivotally attached at a mid-portion thereof to the packer bracket 266. Seed knife 258 is attached to a bottom end of the seed shank 256. During field operations, a first port 206 of the hydraulic cylinder 264 is connected via a valve 84 to an active hydraulic source 80, such that the hydraulic cylinder 264 acts as a trailing arm actuator and exerts a substantially constant bias force BF on the top end of the seed shank 256, causing same to pivot about the axis BB' and bear against a stop on the packer bracket 266 such that the bias force is transferred to the packer bracket 266 and parallel linkage 202 which are pushed downward to force the bottom end of the knife 258 in the ground and create the seed furrow. Seed is provided to the seed feed 260 and is deposited into the seed furrow created by the seed knife 258.

A packer adjustment brace 270 is attached to the packer wheel arm 268 and engages a slot in the packer bracket 266. The brace 270 is moved along the slot to set the vertical position of the seed knife 258 with respect to the packer wheel 272 at the required location to provide a desired depth D2 of the seed furrow and then the brace 270 is locked to the packer bracket 266. The bias force BF pushes the packer wheel 272 against the ground 205.

To move the knife 258 up and out of engagement with the ground, the active hydraulic source 80 is connected to a second port 207 on the hydraulic cylinder 264 to retract the hydraulic cylinder 264 and pivot the top end of the seed shank 256 toward the hydraulic cylinder 264 and cause a recess in the seed shank 256 to bear against a pin providing the axis BB at which point further retraction of the hydraulic cylinder 264 raises the parallel linkage 202 of the trailing arm 254, and the packer wheel arm 268 to the transport position.

Each fertilizer assembly 220 comprises a mounting bracket 224 attached to the frame 215. The mounting bracket 224 is connected to an elongate member 228 through a height adjustable connection 226. By using the height adjustable connection 226, the distance between the bottom of the fertilizer knife 232 and the frame 215 can be varied to set the depth D1 of the fertilizer furrow. A fertilizer knife shank 230 is pivotally connected to the lower end of the elongate member 228 with a shank pin 229, and a fertilizer knife 232 is attached to the fertilizer knife shank 230 and is biased downward by a hydraulic cylinder 236.

The hydraulic cylinder 236 is connected via a valve 85 to the active hydraulic source 80 at a first port 211 thereof and exerts a downward force on the fertilizer knife 232 by exerting an upward bias force BF on the front end of the knife shank 230 forward of the shank pin 229. The bias force BF is sufficient to maintain the fertilizer knife 232 at an operating position at the maximum downward position during normal operations, thereby maintaining the fertilizer knife 232 at a substantially constant vertical position with respect to the frame 215, such that as the frame 215 moves across a field, the depth of the fertilizer furrow D1 is maintained more or less consistent, as the frame 215 will move up and down on the wheels of the implement following the ground, as is well known in the art. When the fertilizer knife 232 contacts an obstruction, such as a rock or the like, the knife will trip and move upward against the bias force of the hydraulic cylinder 236 to clear the obstruction, and then move to the operating position again. Fertilizer is provided to the fertilizer feed 238 and is deposited into the fertilizer furrow created by the fertilizer knife 232.

Figure 2:
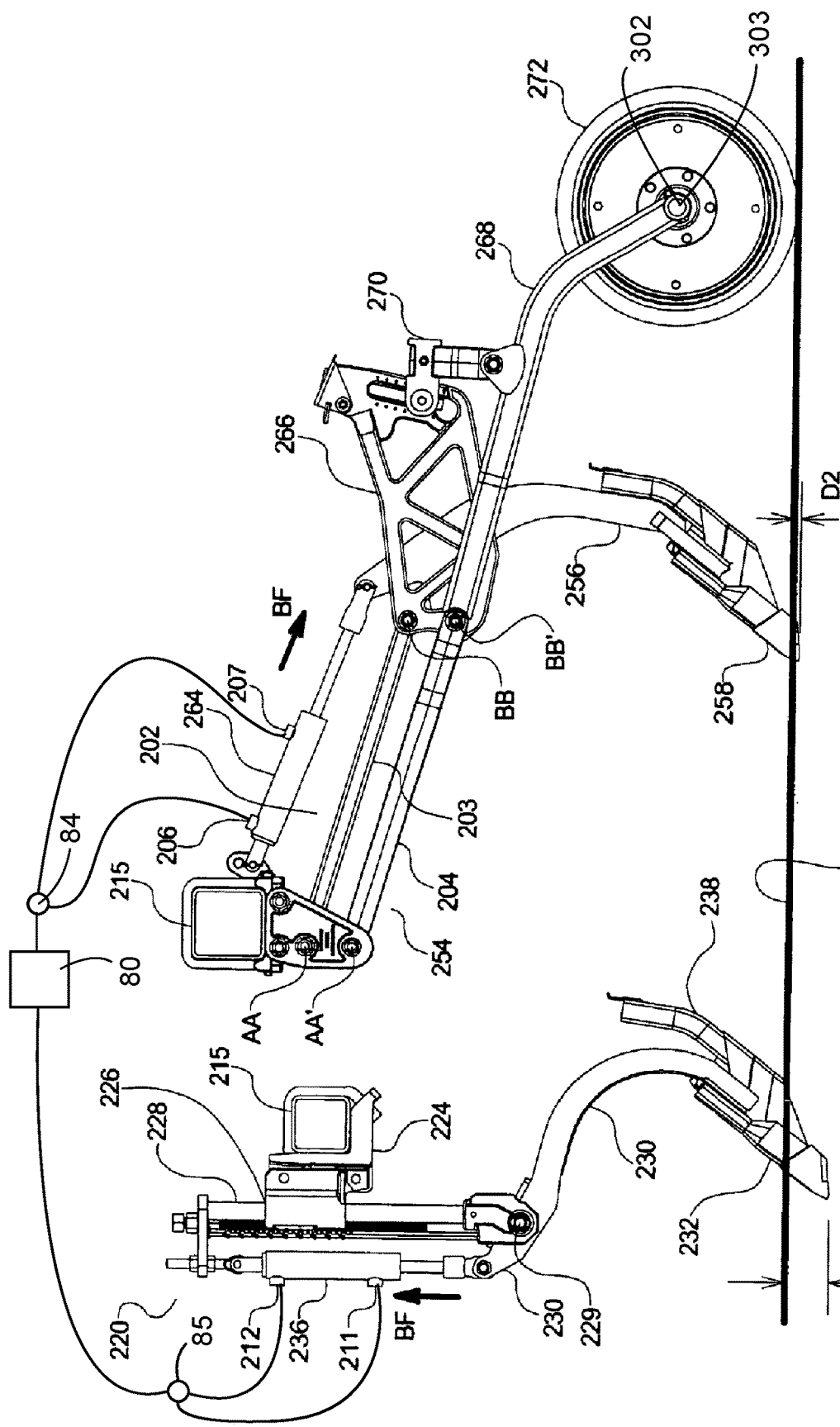
FIG. 2 is a schematic side elevation view of the air seeder of FIG. 1.

Because the frame 215 is fixed in vertical relationship to the wheels carrying the frame, the seed knives 258 and packer wheels 272 are raised from the operating position shown in FIG. 2 to the transport position (not shown) by the hydraulic cylinder 264, while the frame stays at a constant vertical position with respect to the ground. Similarly, the active hydraulic source 80 is connected to a second port 212 on the hydraulic cylinder 236 to extend the hydraulic cylinder 236 and move the fertilizer knives 232 upward to the raised transport position.

Figure 3:
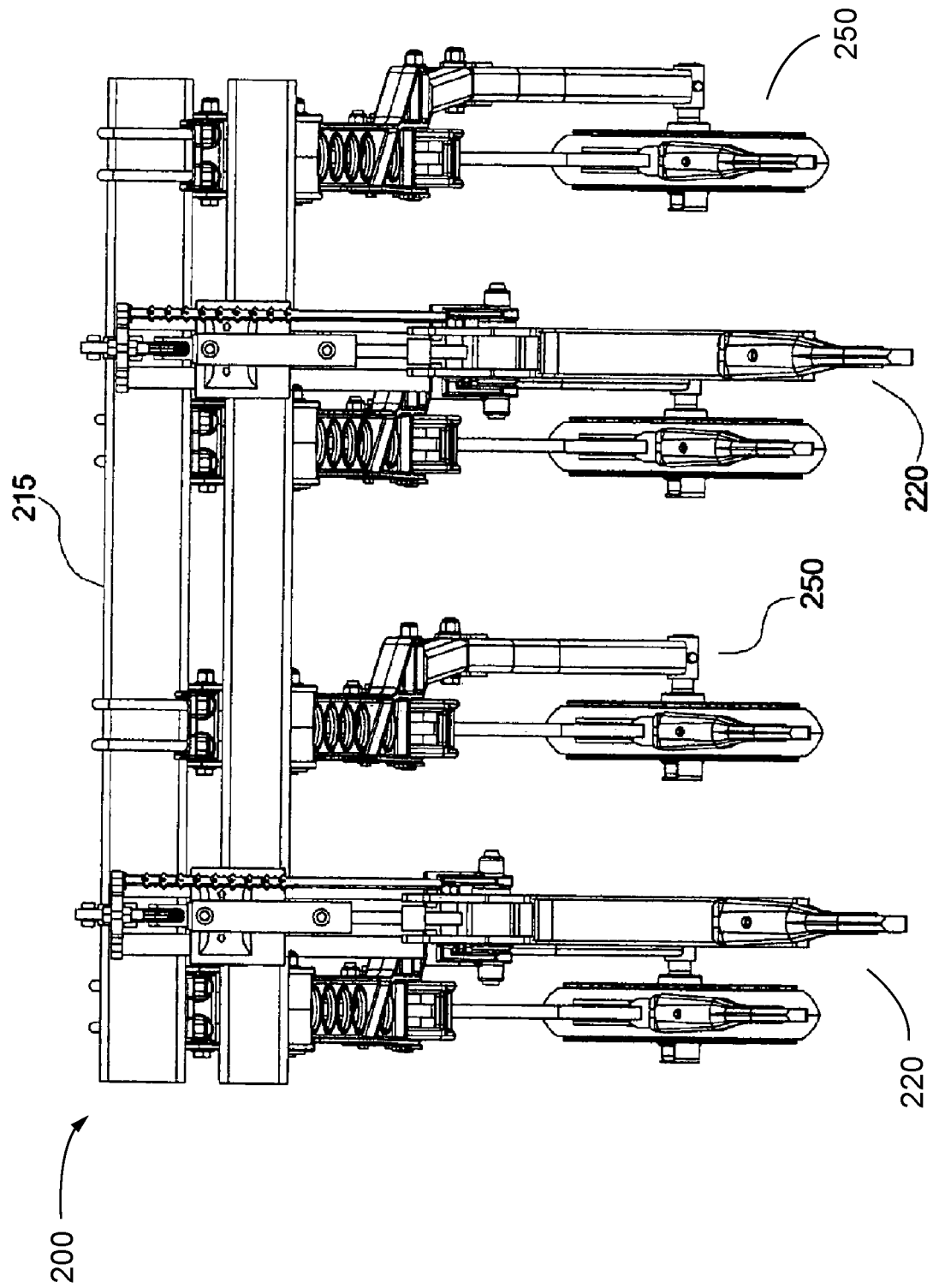
FIG. 3 is a front elevation view of the air seeder of FIG. 1.

While the air seeder 200 of the '938 Publication as described above and as illustrated in FIGS. 1-3, may serve its intended purpose, it is recognized that the depth placement of fertilizer is not as critical as the depth placement of the seed. Accordingly, by managing the total applied downforce or downpressure of all the seeding assemblies 250 and the fertilizing assemblies 220 across the implement 200, the more critical seed planting depth can be ensured by increasing the downforce applied to the seeding assemblies 250 as necessary to maintain the proper seed planting depth while correspondingly reducing the applied downforce of the fertilizer assemblies 220.

One method of managing the total applied downforce of the implement to ensure acceptable seed planting depth may be to determine a total downforce FT of the implement 200 by summing the downforce applied to each of the seed assemblies 250 (the "Seed Assembly Applied Force" or "SAAF") and the downforce applied to each of the fertilizer assemblies 220 (the "Fertilizer Assembly Applied Force" or "FAAF"). The total downforce FT is then compared to a maximum downforce FM. The maximum downforce FM may be the total weight of air seeder 200 or it can be an amount set by the operator, which is less than the total weight of air seeder 200. If the total downforce FT is greater than the maximum downforce FM, the FAAF applied to each of the fertilizer assemblies 220 is reduced by a proportional amount of the total downforce FT until the total downforce FT is less than the maximum downforce FM. This allows each of the seed assemblies 250 to maintain the necessary SAAF to keep the depth of seed planting at an acceptable level. In one embodiment, the total of the FAAF is less than the total of the SAAF.

Although the embodiment of the air seeder 200 is described and illustrated with hydraulic actuators to provide the variable applied downforce, it should be appreciated that any device capable of applying a variable downforce can be used in place of the hydraulic cylinders, including but not limited to, pneumatic cylinders or electronic linear actuators.

Figure 4:
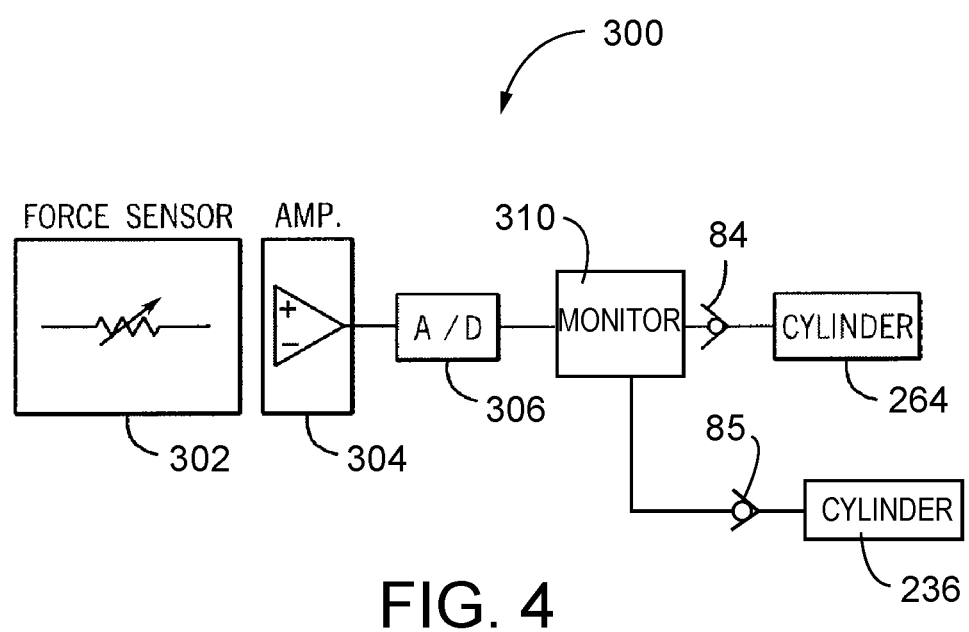
FIG. 4 is a schematic illustration of the control system for managing the downforce applied to each of the seed assemblies and fertilizer assemblies.

FIG. 4 is a schematic embodiment of a control system 300 for controlling the SAAS and FAAF, such as the PackMaster™ control system from Bourgault Industries, Ltd. The control system 300 includes a load cell 302 installed on axle 303 (FIG. 2) where packer wheel 272 is mounted to packer wheel arm 268. The load cell 302 is in electrical communication with a monitor 310. The monitor 310 may be mounted within the cab of the tractor (not shown) pulling the air seeder implement 200 through the field. The monitor 310 may include a central processing unit ("CPU"), memory and a graphical user interface ("GUI") allowing the user to view and enter data into the monitor. An example of a suitable monitor is disclosed in U.S. Pat. No. 8,386,137 which is incorporate herein by reference in its entirety.

Monitor 310 is in communication with the valve 84 to control pressure in hydraulic cylinder 264 to adjust the SAAF applied by cylinder 264 based on a selected value entered into the monitor 310 by an operator. An amplifier 304 and an analog/digital converter 306 may be disposed between the load sensor 302 and the monitor 310. To control the FAAF, the monitor 310 is in communication with the valve 85 to control the pressure in hydraulic cylinder 236. Knowing the amount of pressure applied to cylinder 264 to adjust SAAF, pressure in hydraulic cylinder 236 is maintained at an amount equal to or less than hydraulic cylinder 264.

In another embodiment, seed assembly 250 may be replaced with a disc opener unit (such as that referenced as element "(20)" in U.S. Patent Publication Nos. US20110313575 and US20110313572, both of which are incorporated herein by reference in their entireties ("the '575 and '572 Publications"). In such an embodiment, load cell "(78)" as disclosed in the '575 and '572 Publications is used in place of load cell 302 in the control system 300.

Various modifications to the disclosed embodiments of the apparatus and the general principles and features of the system and methods described herein will be readily apparent to those of skill in the art. Thus, the scope of the appended claims are not to be limited to the embodiments of the apparatus, system, and methods described herein and illustrated in the drawing figures.

What is claimed is:

1. A method of controlling downforce on a planter, the planter comprising:
   a frame;

a plurality of disc openers carried by the frame for forming a plurality of seed trenches, each of the plurality of disc openers having a disc opener actuator to adjustably apply a disc opener downforce; and a plurality of fertilizer assemblies carried by the frame and disposed to place fertilizer between the seed plurality of trenches, each of the plurality of fertilizer assemblies having a fertilizer assembly actuator to adjustably apply a fertilizer assembly downforce;

the method comprising:

summing the disc opener downforce of all of the plurality of disc openers and the fertilizer assembly downforce of all of the plurality of fertilizer assemblies to determine a total applied downforce;

comparing the total applied downforce to a maximum downforce, wherein the maximum downforce is a total weight of the planter or an amount less than the total weight of the planter and set by an operator; and reducing the total applied downforce when the total applied downforce is equal to or greater than the maximum downforce.

2. The method of claim 1, wherein the maximum downforce is a total weight of the planter.

3. The method of claim 1, wherein the maximum downforce is a preselected amount less than a weight of the planter.

4. The method of claim 1, further comprising maintaining the sum of the fertilizer assembly downforces of all of the plurality of fertilizer assemblies to be less than the sum of the disc opener downforces of all of the plurality of disc openers.

5. The method of claim 1, further comprising maintaining the fertilizer assembly downforce of each of the plurality of fertilizer assemblies to be less than the disc opener downforces of each of the plurality of disc openers.

6. The method of claim 1, wherein reducing the total applied downforce comprises reducing the fertilizer assembly downforces of all of the plurality of fertilizer assemblies while maintaining the disc opener downforces of all of the plurality of disc opener.

7. The method of claim 1, wherein reducing the total applied downforce includes reducing the fertilizer assembly downforce of all of the plurality of fertilizer assemblies.

8. The method of claim 1, wherein reducing the total applied downforce comprises maintaining the disc opener downforce of all of the plurality of disc openers.

9. A method of controlling downforce on a planter, the method comprising:

summing disc opener downforces of all of a plurality of disc openers carried by a planter frame and fertilizer assembly downforces of all of a plurality of fertilizer assemblies carried by the planter frame to determine a total downforce applied by the planter, wherein each of the disc openers and fertilizer assemblies are configured to adjustably apply the downforces;

comparing the total downforce to a maximum downforce, wherein the maximum downforce is a total weight of the planter or an amount less than the total weight of the planter and set by an operator; and reducing the total downforce when the total downforce is equal to or greater than the maximum downforce.

10. The method of claim 9, wherein the maximum downforce is a total weight of the planter.

11. The method of claim 9, wherein the maximum downforce is a preselected amount less than a weight of the planter.

12. The method of claim 9, further comprising maintaining the sum of the fertilizer assembly downforces of all of the plurality of fertilizer assemblies to be less than the sum of the disc opener downforces of all of the plurality of disc openers.

13. The method of claim 9, further comprising maintaining the fertilizer assembly downforce of each of the plurality of fertilizer assemblies to be less than the disc opener downforces of each of the plurality of disc openers.

14. The method of claim 9, wherein reducing the total applied downforce comprises reducing the fertilizer assembly downforces of all of the plurality of fertilizer assemblies while maintaining the disc opener downforces of all of the plurality of disc opener.

15. The method of claim 9, wherein reducing the total applied downforce includes reducing the fertilizer assembly downforce of all of the plurality of fertilizer assemblies.

16. The method of claim 9, wherein reducing the total applied downforce comprises maintaining the disc opener downforce of all of the plurality of disc openers.

\* \* \* \* \*